United States Patent
Maria

(10) Patent No.: US 11,304,091 B2
(45) Date of Patent: Apr. 12, 2022

(54) USER PLANE REPLICATOR

(71) Applicant: AT&T Mobility II LLC, Atlanta, GA (US)

(72) Inventor: Arturo Maria, Bellevue, WA (US)

(73) Assignee: AT&T MOBILITY II LLC, Atlanta, GA (US)

(*) Notice: Subject to any disclaimer, the term of this patent is extended or adjusted under 35 U.S.C. 154(b) by 0 days.

(21) Appl. No.: 16/400,141

(22) Filed: May 1, 2019

(65) Prior Publication Data

US 2020/0351708 A1 Nov. 5, 2020

(51) Int. Cl.
| | |
|---|---|
| *H04W 28/06* | (2009.01) |
| *H04W 4/70* | (2018.01) |
| *G06F 9/455* | (2018.01) |
| *H04W 4/44* | (2018.01) |
| *H04W 12/122* | (2021.01) |

(52) U.S. Cl.
CPC ........ *H04W 28/06* (2013.01); *G06F 9/45558* (2013.01); *H04W 4/44* (2018.02); *H04W 4/70* (2018.02); *H04W 12/122* (2021.01); *G06F 2009/45595* (2013.01)

(58) Field of Classification Search
None
See application file for complete search history.

(56) References Cited

U.S. PATENT DOCUMENTS

| 2018/0144139 A1* | 5/2018 | Cheng ................. H04L 63/0227 |
| 2018/0270219 A1* | 9/2018 | Li .......................... H04L 63/083 |
| 2020/0076831 A1* | 3/2020 | Baughman ............. H04L 63/14 |
| 2020/0076850 A1* | 3/2020 | Edgar .................. G06N 3/0445 |
| 2020/0213287 A1* | 7/2020 | Zhang ..................... H04L 12/40 |
| 2020/0314116 A1* | 10/2020 | Rodriguez Bravo ....................... H04L 63/1408 |

* cited by examiner

*Primary Examiner* — Adnan Baig
(74) *Attorney, Agent, or Firm* — Guntin & Gust, PLC; Kenneth Kwan

(57) ABSTRACT

A replicator device may capture and evaluate data traffic before it affects the core network or before it is delivered to the end device. After capturing the data traffic, the replicator may replicate the effect of the data traffic on mobile devices or other devices and take an appropriate corrective action.

20 Claims, 7 Drawing Sheets

US 11,304,091 B2

USER PLANE REPLICATOR

BACKGROUND

Networks, such as 5G, may be designed to segment traffic into a control plane and user plane structure. Traffic from mobile devices may traverse gNodeBs and then may be delivered to the user plane serving gateway (e.g., user-SGW) after attachment and authentication. U-SGW's may be virtual network functions (VNFs). U-SGW's may be implemented in multiple regional datacenters in response to user demand and in order to optimize data traffic. Traffic delivered to and from user plane network elements may be unprotected from malicious software that may cause poor performance, malicious attacks, or errors.

SUMMARY

The user plane replicator (UPR) may capture and evaluate data traffic when it enters a communication network. The UPR may capture and evaluate data traffic before it affects the core network or before it is delivered to the end device (e.g., mobile device). After capturing the data traffic, the UPR may replicate the effect of the data traffic on mobile devices or other devices and take an appropriate corrective action, if needed.

In an example, an apparatus may include a processor and a memory coupled with the processor that effectuates operations. The operations may include obtaining an indication that a first device is connected with a network; based on the first device connecting with the network, obtaining redirected data traffic, wherein the redirected traffic is from the device to a second device; simulating the data traffic on a virtual machine that replicates the image of the second device; based on the simulating, determining a risk score for the data traffic; and based on the risk score, sending instructions to not allow the data traffic to be sent to the second device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

FIG. 6B is a representation of an exemplary hardware platform for a network.

DETAILED DESCRIPTION

Internet of things (IoT) devices, autonomous vehicles (AVs), or other end devices may be more susceptible to malicious hackers based on their possible repetitive contact or accessibility with end users without initial screening for malicious intent. Further, because any hack of IoT devices, AVs, or mobile devices may result in financial loss, extensive property damage, severe injury, or loss of human life, it is even more important that these end devices are secure. For example, a hacked IoT device may release toxins in the air that may be harmful to humans or release water that may cause major property damage. In another example, AVs (e.g., an autonomous car) may be maliciously or dangerously configured to go speeds of 80 mph in a 35 MPH zone or travel on sidewalks instead of streets. In another example associated with an SMS text between mobile phones, while most SMS text may be displayed as text or an emoji on a remote mobile phone user display, a maliciously configured phone may activate financial transfer programs that should not be activated. As disclosed herein, a user plan replicator (also referred herein as replicator) may create images of devices connected with a network, capture data traffic emanating from the devices, and determine whether to forward the data traffic based on virtual simulations. The capture and subsequent simulation may be done before data traffic enters the core network.

Figure 1:
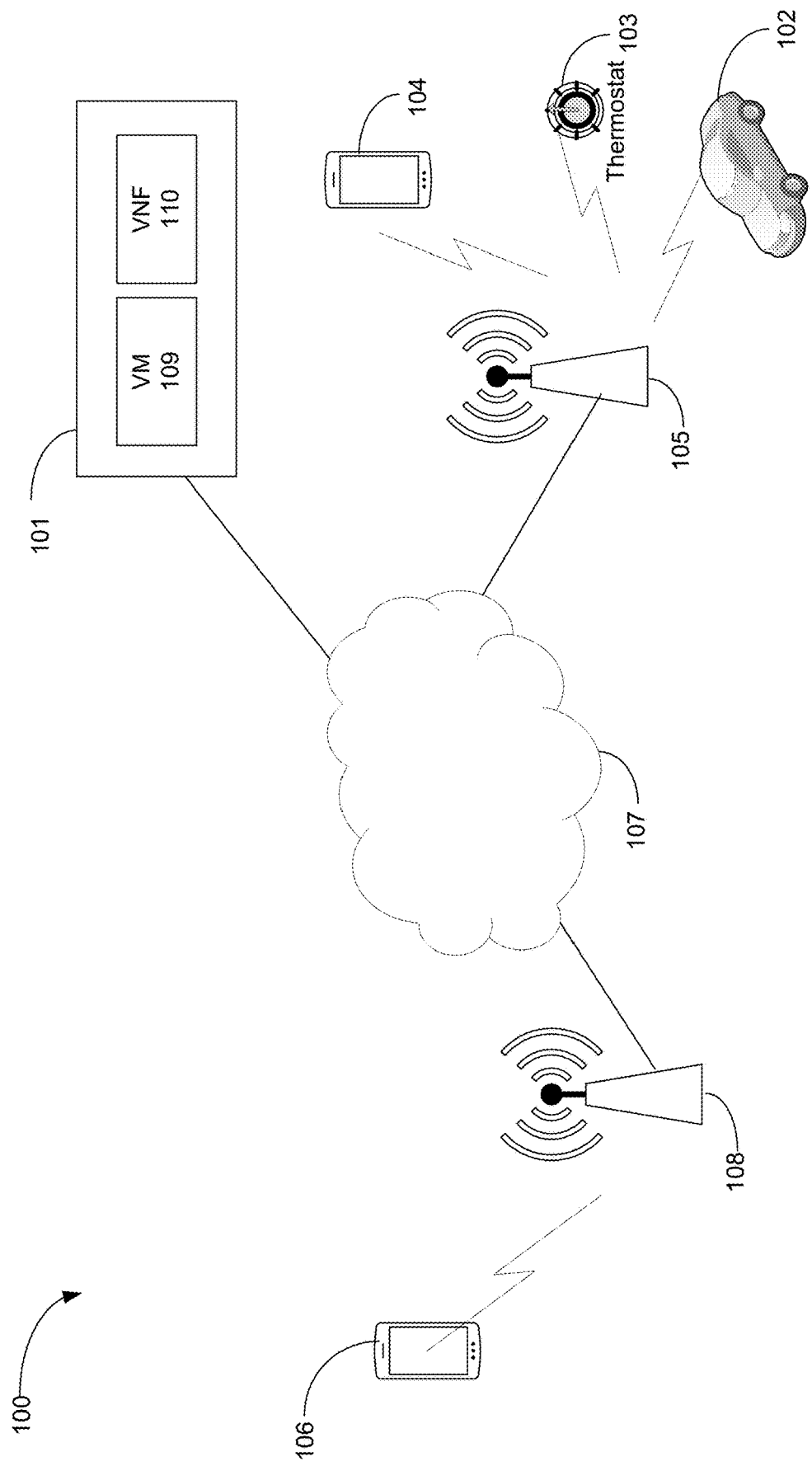
FIG. 1 illustrates an exemplary system that may implement a user plane replicator.

FIG. 1 illustrates an exemplary system that may implement a user plane replicator. System 100 may include user plane replicator (UPR) 101, mobile device 106, base station 105, mobile device 104 (e.g., phone or laptop), IoT device 103, or AV 102. All such devices may be communicatively connected with each other via network 107, base station 105, base station 108, or the like. AV 102 may be a vehicle designed for air, land, or water. Examples of apparatuses that may fall into the scope of IoT device 103 may include connected security systems, thermostats, cars, electronic appliances, lights in household and commercial environments, alarm clocks, speaker systems, vending machines, and pressure sensors and release valves, among other things. It is contemplated that system 100 may include a wired network or wireless network (e.g., 5G, LTE, Wi-Fi). Replicator 101 (also referred herein as UPR 101) may include an image of each apparatus (e.g., IoT device 103, mobile device 106, base station 105, mobile device 104, IoT device 102, or AV 201) connected with network 107, which may be apparatuses within a core network, access network, or local area network. There may be multiple replicator 101s distributed throughout a network and they may exchange images with each other as necessary. Each apparatus image may be replicated as a virtual machine (VM) 109 or virtual network function (VNF) 110 that may simulate the functions of the end apparatuses (e.g., IoT device 103 or AV 102).

Figure 2:
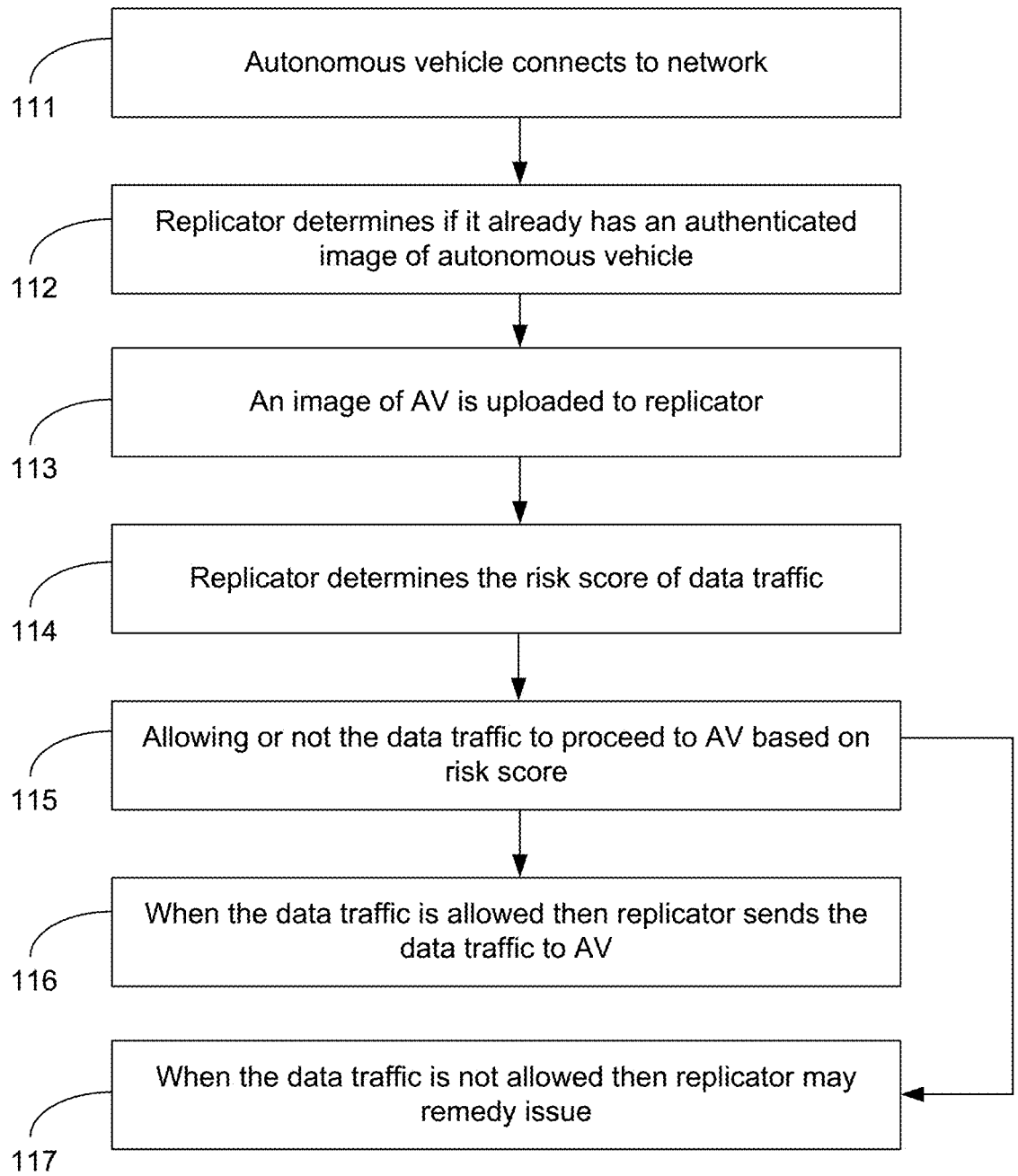
FIG. 2 illustrates an exemplary method that may use a user plane replicator.

FIG. 2 illustrates an exemplary method that uses a user plane replicator. At step 111, AV 102, for example, may connect to network 107 and be authenticated. At step 112, replicator 101 may determine if it already has an authenticated image of AV 102. This may be determined by comparing a first image of AV 102 to an already possessed first replicated image of AV 102 in VM 109 (or VNF 110) on replicator 101. If the first image matches the first replicated image, then replicator 101 may use the first replicated image for any future simulations. The comparison may be of identifiers, hash function results, or the like associated with the first image and the first replicated image. At step 113, an image of AV 102 (e.g., the first image) may be uploaded to replicator 101 (e.g., VM 109) to become the first replicated image. The first image may be replicated if there is no image of AV 102 already in replicator 101 or there is a new image (e.g., second image) on AV 102 that should be replicated into a second replicated image. The new image may be because of a software update of AV 102.

At step 114, replicator 101 may determine the risk score (e.g., worthiness) of data traffic to AV 102 from mobile device 106 (or vice versa). Replicator 101 may obtain data traffic from mobile device 106 and simulate the functions of AV 102 using VM 109. There may be expected results based on the simulation. In example, based on the data traffic from mobile device 106, a speaker in AV 102 should project audio (e.g., a voice) sourced from mobile device 106. Replicator 101 may score (e.g., to get a risk score) the simulated interaction of VM 109 (with the first replicated image) to what is expected to happen. The expectation may be based on previous actions for devices similar to AV 102 or specific to AV 102. For example, the actions may be based on machine learning or artificial intelligence. The score may indicate the risk of negative consequences to people or property if the data traffic (e.g., commands or other data) are sent to AV 102. The score may further be influenced based on a threat level of the action that would be taken by AV 102. For example, increasing the speed of AV 102 over the legal speed of the road (or air way) may be considered a high threat level, while turning on the inside light of the vehicle may be considered a low threat level. The threat level may be a factor that determines whether the risk score is high (e.g., 60%), low (e.g., 10%), medium (e.g., 35%), or the like.

At step 115, replicator 101 may allow or not allow the data traffic obtained in step 114 to proceed to AV 102, based on the score being within a threshold number. In a first example, if the score is in the low range then data traffic is allowed. In a second example, if the score is in the high range (e.g., above 59%) then the data traffic is not allowed. In a third example, if the score is in the medium range (e.g., between 34 and 59%), then an alert may be sent to an authorized user associated with AV 102 (e.g., occupant of AV 102 or administrator for AV 102) to authorize the data traffic. In a fourth example, being above or below a certain number of data traffic flows indicated to be medium or high (e.g., three previous traffic flows with the same risk score) may trigger allowing, not allowing, or sending an alert.

At step 116, when the data traffic is allowed then replicator 101 may send the data traffic to AV 102. At step 117, when the data traffic not allowed then replicator 101 may remedy the issue with the first image of AV 102. For example, replicator 101 may send instructions to AV 102 to install a previous validated image (e.g., a basic default image). The previous validated image may be stored on replicator 101 or some other device in system 100, such as another server (not shown), a nearby AV (not shown), mobile device 104, or the like.

Figure 3:
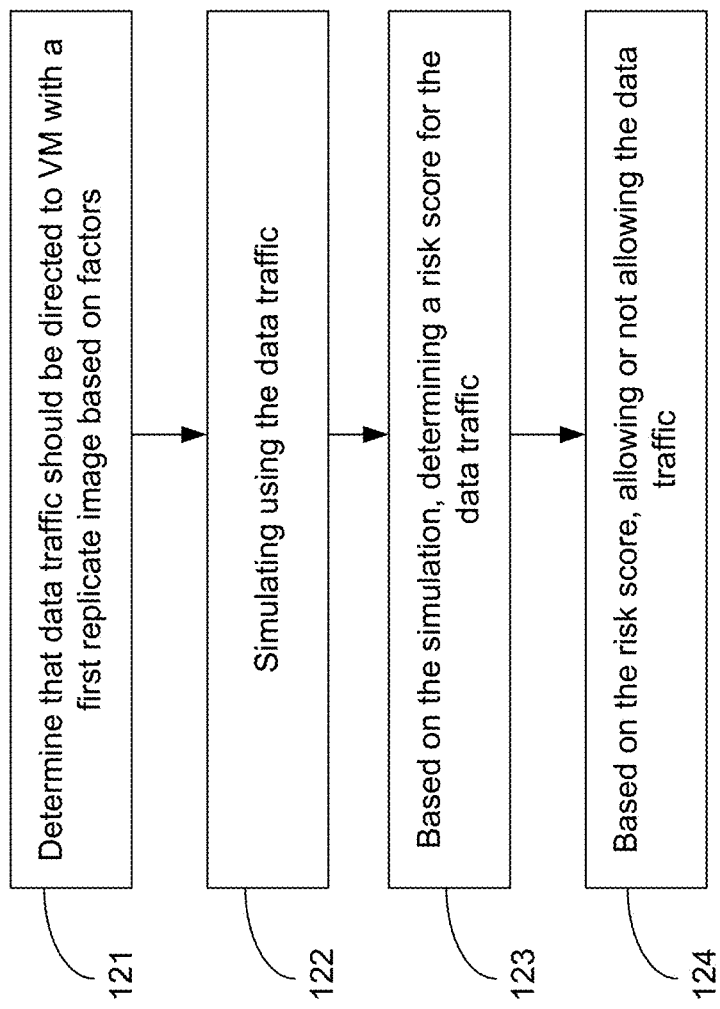
FIG. 3 illustrates another exemplary method that may use a user plane replicator.

FIG. 3 illustrates an exemplary method that uses a user plane replicator. There may be times where replicator 101 is only used based on certain factors, which is described in more detail herein. At step 121, there may be a determination whether data traffic (e.g., traffic obtained from mobile device 106) should be directed to VM 109 to simulate AV 102. VM 109 may have a first replicated image and AV 102 may include a matching first image. This determination may be based on one or more different factors. For example, with reference to AV 102 being used as a ride hailing service, the factors may include number of trips, total number of people for trips within a period, or total number of people within AV 102 for a trip, detected number of connections via Wi-Fi, Bluetooth, or the like, or GPS coordinates of mobile devices within a radius of AV 102, among other things. The aforementioned factors may be significant because the increased number of interactions with end users may increase the possibility of interacting with users that have malicious intent (or have hacked devices that are compromised) interact with AV 102. Additional factors may include period of time since last simulation, travel history of AV 102 riders within a period, number of packages delivered by AV 102, type of packages delivered by AV 102, destination of AV 102, average risk score in a period, geographical location (e.g., proximate to another device, such as within 10 feet), or type of applications active on mobile device 104, IoT device 103, or AV 102, among other things. It is contemplated that disclosed factors may be associated with any of the devices described herein and their use may be influenced by machine learning or artificial intelligence.

At step 122, based on the factors of step 121, the data traffic is directed to VM 109 to be simulated. At step 123, based on the simulation of the data traffic, determining a risk score for the data traffic. At step 124, based on the risk score, allowing or not allowing the data traffic. Steps of FIG. 2 and FIG. 3 may be combined or skipped as necessary. Replicator 101 or other network devices may perform all or some of the steps as described in FIG. 2 and FIG. 3.

It is contemplated that there may be an attempt to send data traffic remotely through a core network or directly (e.g., point-to-point communication). For example, mobile device 106 may remotely send to mobile device 104 through network 107 or directly send via Wi-Fi or Bluetooth. Even in the aforementioned situations, replicator 101 may be used. In a scenario with regard to attempted direct communication, AV 102 may be redirect data traffic from nearby mobile device 104 (e.g., rider in AV 102) to replicator 101 before accepting the data traffic. It is further contemplated that replicator 101 may be used with any mix of mobile devices, IoT devices, AVs, or other devices.

In a 5G context, UPR 101 may capture and evaluate data traffic when it exits the U-SGW and before it is delivered to the mobile device (e.g., UE). UPR 101 may capture and evaluate all data traffic before it affects the 5G core network. On the reverse flow, UPR 101 may evaluate data traffic before it is delivered to mobile device 106. UPR 101 may replicate the effect of the data traffic on mobile devices and take appropriate action such as blocking or modifying traffic, capturing the traffic for Communications Assistance for Law Enforcement Act (CALEA) purposes, or improving the performance of the network by compressing data or other data manipulation. Using UPR 101, service providers may achieve efficiencies in the network and potentially offer new services associated with improving the performance and security of mobile devices, IoT devices, or AVs, among other devices connected with the network.

UPR 101 may act as a Big Data repository for central collection of end-user activity. The effect of malicious code may be evaluated before it hits the 5G Core Network and the mobile device. In the event of a malicious attack to the network, UPR 101 may filter traffic and shut off network traffic to a selected number of devices affected instead of the whole network. UPR 101 may have an Artificial Intelligence (AI) machine functionality in which it learns the behavior of connected devices generally for a category of devices or specific to a particular device. Based on this learning, UPR 101 may determine the appropriate risk score for the data traffic and whether to allow the data traffic to proceed within a service provider network. It is contemplated herein that the replication and simulation may be done for end devices in the communication network of a service provider, as well as intermediary devices (MME, PGW, SGW, eNodeB, gNodeB, etc.) along a communications path of the network.

Also note that in 5G network elements may be considered "images" that are stored in containers. In other words, they may be considered not "real" machines but rather virtual network functions (VNFs). Images may be used to represent VNFs. These images may be moved in and out of worker machines who conduct the real work processed. The images may be stored in containers. Containers may be considered programs which provide the work environment, so images can be moved in an out for execution in worker nodes. The process of creating "worker nodes" and moving images in and out of containers residing in worker nodes is often called orchestration.

Virtual machines can be isolated software containers, operating independent of other virtual machines. Such isolation can assist in realizing virtual-machine-based virtual environments that can execute applications and provide services with availability, flexibility, and security, in some cases, surpassing those on traditional, non-virtualized systems. Virtual machines can encapsulate a complete set of virtual hardware resources, including an operating system and all its applications, inside a software package. Encapsulation can make virtual machines quite portable and manageable. Indeed, virtual machines can be hardware-independent, and can be portably provisioned and deployed on one of multiple different computing devices, operating systems, and environments. Indeed, depending on the availability of computing devices within a cloud environment (e.g., UPR 101) a particular virtual machine 109 may be provisioned on any one (or multiple) of the devices included in a cloud environment.

In some instances, a virtual machine manager (not shown) may be provided in connection with a cloud computing system (or other system hosting virtual infrastructure). Virtual machine managers, or hypervisors, may be implemented as software- and/or hardware-based tools used in the virtualization of hardware assets (i.e., as virtual machines 109) on one or more host computing devices (e.g., UPR 101). A virtual machine manager may be used to run multiple virtual machines, including virtual machines with different guest operating systems, on one or more host computers (e.g., UPR 101). The virtual machine manager may provide a shared virtual operating platform for multiple virtual appliances and guest operating systems and enable a plurality of different virtual machines (and guest operating systems) to be instantiated and run on computing devices and hardware hosting virtual infrastructure (e.g., UPR 101 or mobile device 104). Further, virtual machine managers, in some instances may be run natively, or as "bare metal," directly on host computing devices' hardware to control the hardware and to manage virtual machines provisioned on the host devices. In other instances, "hosted" virtual machine managers may be provided that is run within the operating system of another host machine, including conventional operating system environments. Lastly, a virtual component can be programmed to perform application specific functions that may be associated with microcontroller, sensor, motors, actuators, lighting, or radio frequency identification (RFID), among other things.

With the above in mind, VM 109 may be used or VNF 110 may be used. The simulation is done by the virtual image. Note that a virtual machine (VM) includes its own operating system. An example is VMWARE. A virtual image can be moved to "worker nodes" for execution. They do not need a full virtual machine environment. The images may be considered VNFs and can be stored in "container" products such as Docker. Therefore, there may be simulation of the data traffic on a VNF that may be a virtual machine, or a container image moved to a worker computing node for execution. The movement of these VNF images for execution is performed by orchestration software.

Figure 4:
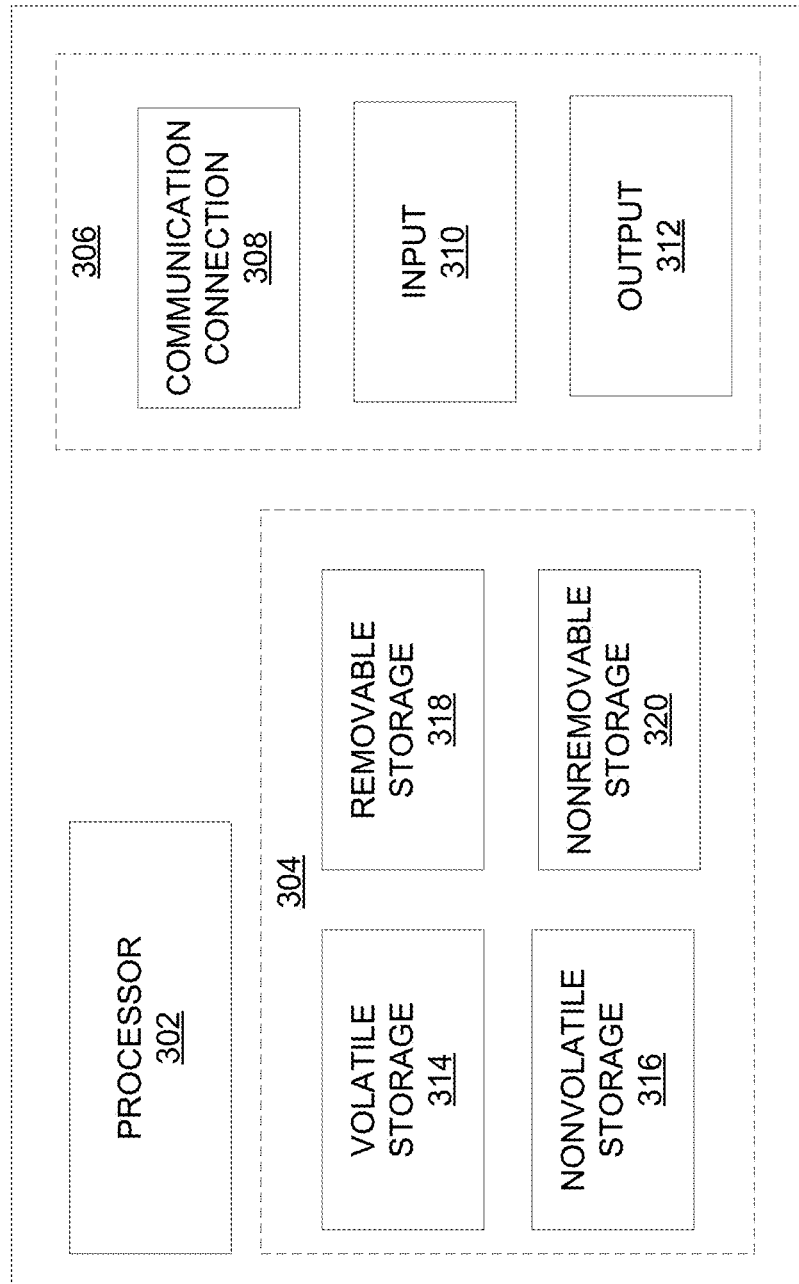
FIG. 4 illustrates a schematic of an exemplary network device.

FIG. 4 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
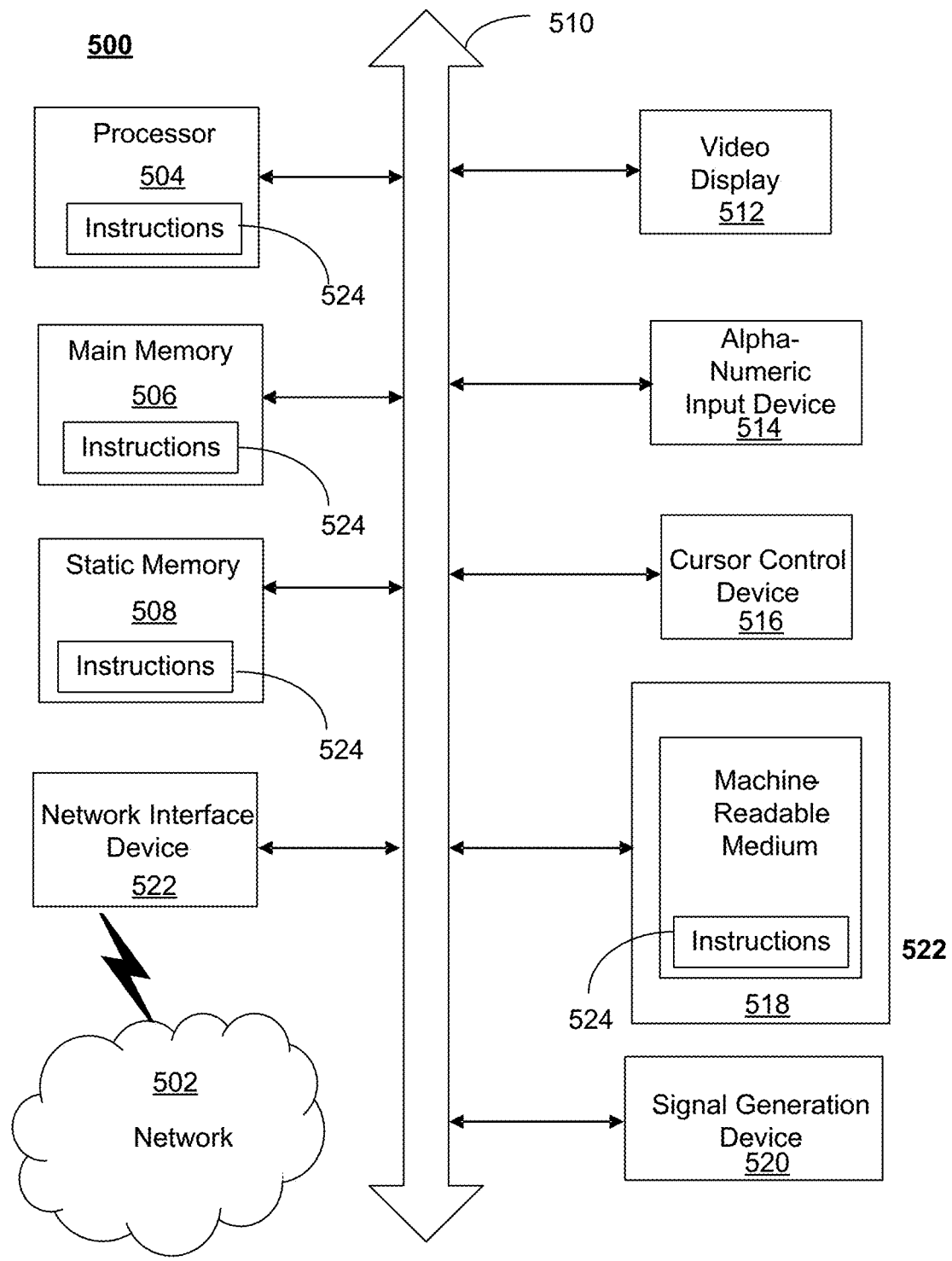
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, user plane replicator (UPR) 101, mobile device 106, base station 105, mobile device 104, IoT device 103, AV 102, and other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6A:
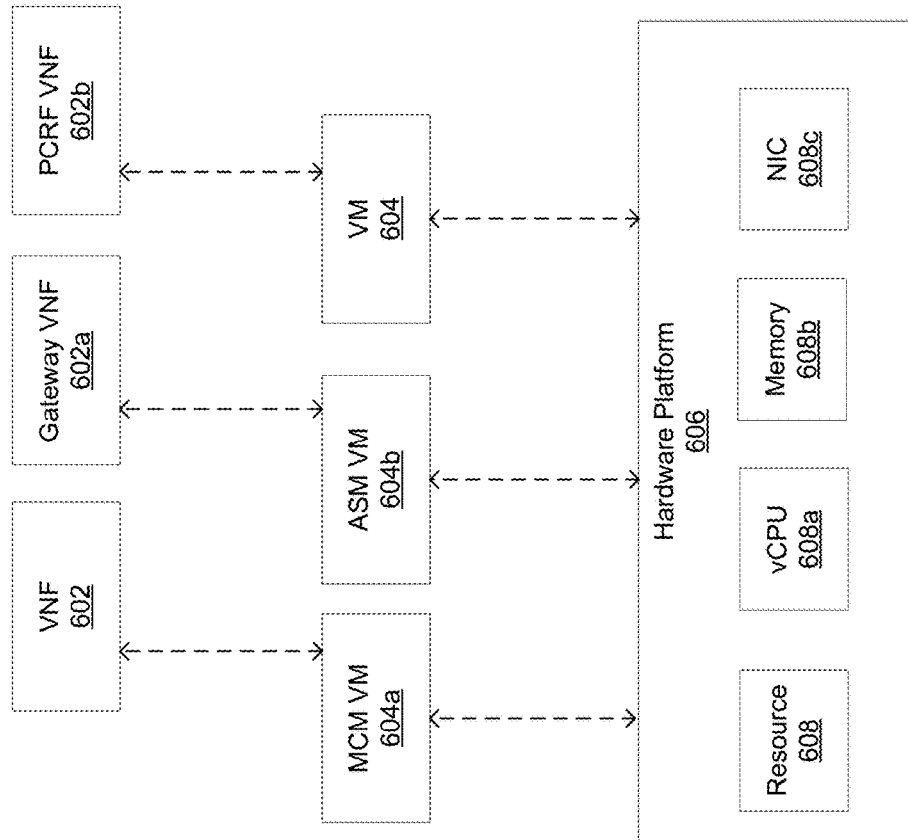
FIG. 6A is a representation of an exemplary network.
Figure 7B:
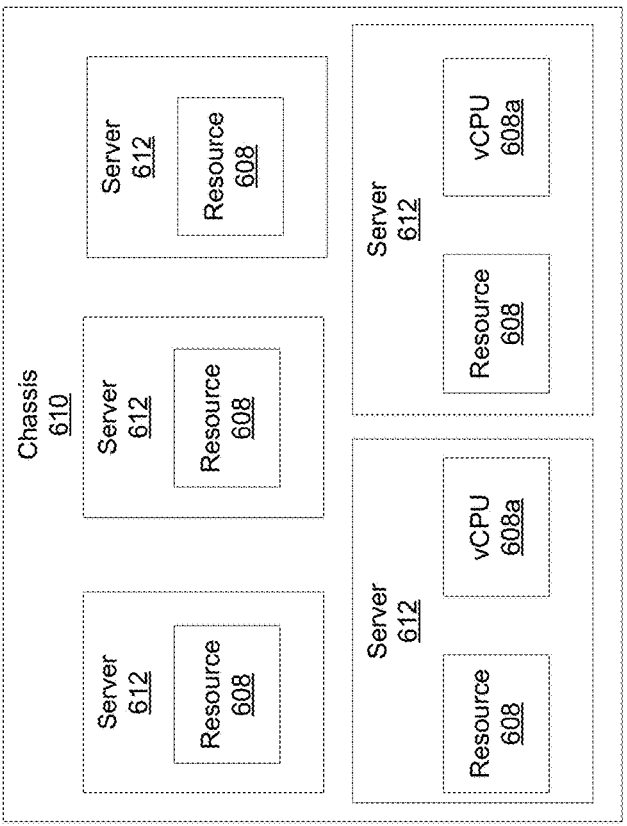
Figure 7B:
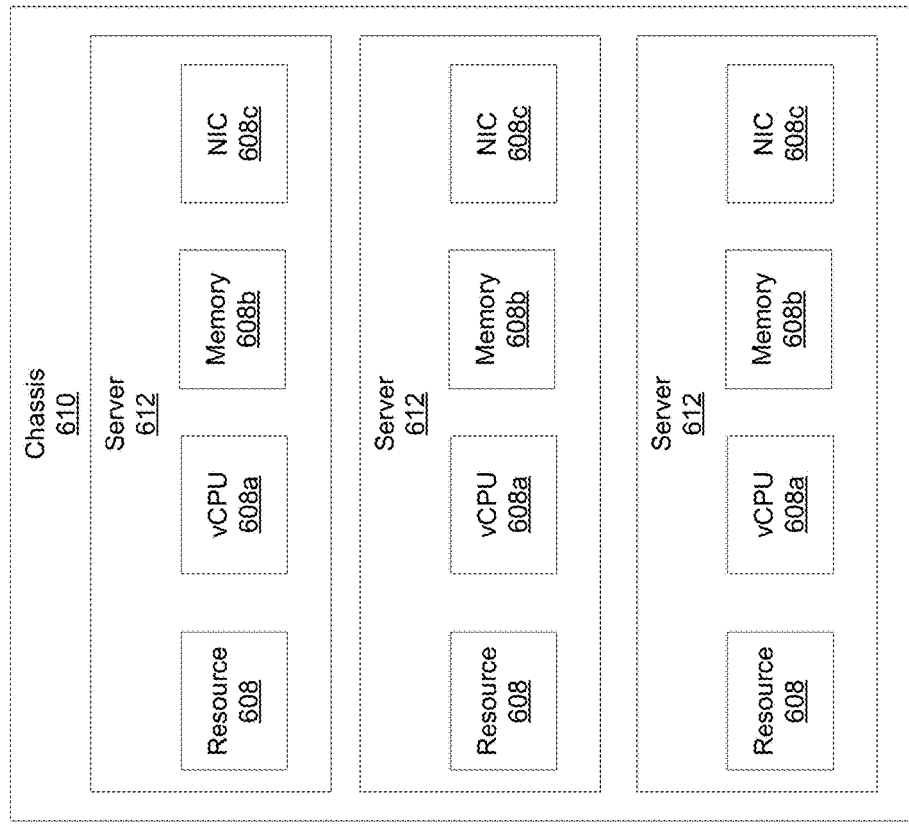

FIG. 6A is a representation of an exemplary network 600. Network 600 (e.g., system 100) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 6A illustrates a gateway VNF 602a and a policy and charging rules function (PCRF) VNF 602b. Additionally or alternatively, VNFs 602 may include other types of VNFs.

Each VNF 602 may use one or more virtual machines (VMs) 604 to operate. Each VM 604 may have a VM type that indicates its functionality or role. For example, FIG. 6A illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

While FIG. 6A illustrates resources 608 as collectively contained in hardware platform 606, the configuration of hardware platform 606 may isolate, for example, certain memory 608c from other memory 608c. FIG. 6B provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 6B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)— would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which messages associated with the user plane replicator can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—user plane replicator—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for determining whether to send data traffic through or to a device. A method, system, computer readable storage medium, or apparatus may obtain an indication that a first device is connected with a network; based on the first device connecting with the network, obtain redirected data traffic, wherein the redirected traffic is from the device to a second device; simulate the redirected data traffic on a virtual machine that replicates the image of the second device; based on the simulating, determine a risk score for the redirected data traffic; and based on the risk score, send instructions to not allow the redirected data traffic to be sent to the second device. The obtaining the redirected data traffic may be further based on the first device being proximate to the second device or the first device running multiple other applications that are not related to the application that originated the redirected data traffic. The second device may be an autonomous vehicle or an internet of things device. Further the apparatus may send an alert to a third device to remedy the image of the second device, wherein the remedy may include sending an updated image to the second device to replace the current image of the second device. The replicator may alter the data sent to the device based on what it is learned after execution. All combinations in this paragraph (including the removal or addition of steps) are contemplated in a manner that is consistent with the other portions of the detailed description. The functions may be distributed over multiple devices.

What is claimed:

1. An apparatus comprising:
    a processor; and
    a memory coupled with the processor, the memory storing executable instructions that when executed by the processor cause the processor to effectuate operations comprising:
        obtaining an indication that a first device is connected with a network;
        based on the first device connecting with the network, obtaining redirected data traffic, wherein the redirected data traffic is from the first device intended for a physical second device, wherein the physical second device is associated with a vehicle;
        based on the obtaining redirected data traffic step, creating a replica of the physical second device using a virtual network function;
        receiving, by the virtual network function of the apparatus, the redirected data traffic;
        simulating, using the redirected data traffic by the virtual network function, actions of the physical second device;
        based on the simulating, determining a risk score for the redirected data traffic, wherein the risk score is based on a threat level of one or more actions of the simulated actions that would be taken by the physical second device if the traffic would have been sent to the physical second device; and
        based on the risk score, sending instructions to not allow data traffic from the first device to be sent to the physical second device.

2. The apparatus of claim 1, wherein the first device is a mobile device.

3. The apparatus of claim 1, wherein the obtaining the redirected data traffic is further based on the first device running multiple other applications that are not related to an application that originated the data traffic.

4. The apparatus of claim 1, wherein the physical second device is an autonomous vehicle and the one or more actions of the simulated actions is an increase in speed of the autonomous vehicle.

5. The apparatus of claim 1, wherein the physical second device is an internet of things device.

6. The apparatus of claim 1, the operations further comprising altering the data traffic and sending the altered data traffic.

7. The apparatus of claim 1, the operations further comprising sending an alert to a third device to remedy the replica of the physical second device, wherein the remedy comprises sending an updated replica to the physical second device.

8. A computer readable storage medium storing computer executable instructions that when executed by a computing device cause said computing device to effectuate operations comprising:
    obtaining an indication that a first device is connected with a network;
    based on the first device connecting with the network, obtaining redirected data traffic, wherein the redirected data traffic is from the first device intended for a physical second device, wherein the physical second device is associated with a vehicle;
    based on the obtaining redirected data traffic step, creating a replica of the physical second device using a virtual network function;
    receiving, by the virtual network function, the redirected data traffic;
    simulating, using the redirected data traffic by the virtual network function, actions of the physical second device;
    based on the simulating, determining a risk score for the redirected data traffic, wherein the risk score is based on a threat level of one or more actions of the simulated actions that would be taken by the physical second device if the traffic would have been sent to the physical second device; and
    based on the risk score, sending instructions to not allow data traffic from the first device to be sent to the physical second device.

9. The computer readable storage medium of claim 8, wherein the obtaining the redirected data traffic is further based on the first device being proximate to the physical second device.

10. The computer readable storage medium of claim 8, wherein the obtaining the redirected data traffic is further based on the first device running multiple other applications that are not related to an application that originated the data traffic.

11. The computer readable storage medium of claim 8, wherein the physical second device is an autonomous vehicle and the one or more actions of the simulated actions is an increase in speed of the autonomous vehicle.

12. The computer readable storage medium of claim 8, wherein the physical second device is an internet of things device.

13. The computer readable storage medium of claim 8, the operations further comprising altering the data traffic and sending the altered data traffic.

14. The computer readable storage medium of claim 8, the operations further comprising sending an alert to a third device to remedy the replica of the physical second device, wherein the remedy comprises sending an updated replica to the physical second device.

15. A system comprising:
    one or more processors; and
    memory coupled with the one or more processors, the memory storing executable instructions that when executed by the one or more processors cause the one or more processors to effectuate operations comprising:
        obtaining an indication that a first device is connected with a network;
        based on the first device connecting with the network, obtaining redirected data traffic, wherein the redirected data traffic is from the first device intended for an autonomous vehicle;

based on the obtaining redirected data traffic step, creating a replica of the autonomous vehicle using a virtual network function;

receiving, by the virtual network function, the redirected data traffic;

simulating, using the redirected data traffic by the virtual network function, actions of the autonomous vehicle;

based on the simulating, determining a risk score for the redirected data traffic, wherein the risk score is based on a threat level of one or more actions of the simulated actions that would be taken by the autonomous vehicle if the traffic had been sent to the autonomous vehicle; and based on the risk score, sending instructions to not allow data traffic from the first device to be sent to the autonomous vehicle.

16. The system of claim 15, wherein the obtaining the redirected data traffic is further based on the first device being proximate to the autonomous vehicle.

17. The system of claim 15, wherein the obtaining the redirected data traffic is further based on the first device running multiple other applications that are not related to an application that originated the data traffic.

18. The system of claim 15, wherein the first device is a second autonomous vehicle.

19. The system of claim 15, wherein the first device is an internet of things device.

20. The system of claim 15, the operations further comprising sending an alert to a third device to remedy the replica of the autonomous vehicle, wherein the remedy comprises sending an updated replica to the autonomous vehicle.

* * * * *